(12) United States Patent
Toraya

(10) Patent No.: US 12,405,235 B2
(45) Date of Patent: Sep. 2, 2025

(54) DEGREE-OF-CRYSTALLINITY MEASUREMENT APPARATUS, DEGREE-OF-CRYSTALLINITY MEASUREMENT METHOD, AND INFORMATION STORAGE MEDIUM

(71) Applicant: Rigaku Corporation, Tokyo (JP)

(72) Inventor: Hideo Toraya, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 176 days.

(21) Appl. No.: 18/507,147

(22) Filed: Nov. 13, 2023

(65) Prior Publication Data

US 2024/0167969 A1    May 23, 2024

(30) Foreign Application Priority Data

Nov. 14, 2022    (JP) .................................. 2022-182119

(51) Int. Cl.
*G01N 23/2055* (2018.01)
*G01N 23/207* (2018.01)

(52) U.S. Cl.
CPC ....... *G01N 23/2055* (2013.01); *G01N 23/207* (2013.01); *G01N 2223/1016* (2013.01); *G01N 2223/60* (2013.01)

(58) Field of Classification Search
CPC ............. G01N 23/2055; G01N 23/207; G01N 2223/1016; G01N 2223/60

See application file for complete search history.

(56) References Cited

U.S. PATENT DOCUMENTS 3,411,001 A * 11/1968 Wilchinsky .......... G01N 23/207
378/81
4,592,082 A * 5/1986 Pawloski ............... G01N 33/24
702/23

(Continued)

OTHER PUBLICATIONS

W. Ruland, "X-ray Determination of Crystallinity and Diffuse Disorder Scattering", Acta Cryst. vol. 14, 1961, pp. 1180-1185.

(Continued)

*Primary Examiner* — Blake C Riddick
(74) *Attorney, Agent, or Firm* — XSENSUS LLP

(57) ABSTRACT

Provided is a degree-of-crystallinity measurement apparatus including: an X-ray scattering pattern acquisition module which acquires an X-ray scattering pattern of a sample including a crystalline portion and an amorphous portion of a target substance; a pattern decomposition module which acquires a diffraction pattern of the crystalline portion and a continuous pattern from the X-ray scattering pattern; a target substance intensity calculation module which calculates an integrated intensity of the target substance based on the X-ray scattering pattern and chemical formula information of the target substance; a target substance pattern calculation module which calculates, from the continuous pattern, a scattering pattern of the target substance including the crystalline portion and the amorphous portion; a structural disorder parameter determination module which determines a structural disorder parameter of the crystalline portion based on the diffraction pattern of the crystalline portion and the scattering pattern of the target substance; and a degree-of-crystallinity output module.

11 Claims, 5 Drawing Sheets

(56) References Cited

U.S. PATENT DOCUMENTS

| | | | | |
|---|---|---|---|---|
| 10,161,888 B2* | 12/2018 | Ikeda | ............ | G01N 23/207 |
| 11,161,093 B1* | 11/2021 | Narasimharao | ...... | B01J 35/77 |
| 2004/0231566 A1* | 11/2004 | Wang | ............ | C04B 28/021 |
| | | | | 106/705 |
| 2007/0243620 A1* | 10/2007 | Bates | ............ | G01N 23/207 |
| | | | | 702/19 |
| 2007/0286344 A1* | 12/2007 | Yokhin | ............ | G01N 23/207 |
| | | | | 378/74 |
| 2008/0080670 A1* | 4/2008 | Harding | ............ | G01V 5/22 |
| | | | | 378/53 |
| 2008/0175352 A1* | 7/2008 | Kogan | ............ | G01N 23/20025 |
| | | | | 378/81 |
| 2009/0213992 A1* | 8/2009 | Iwasaki | ............ | G01N 23/201 |
| | | | | 378/208 |
| 2010/0160634 A1* | 6/2010 | Akimoto | ............ | A61P 17/04 |
| | | | | 546/45 |
| 2011/0184659 A1* | 7/2011 | Bates | ............ | G01N 23/207 |
| | | | | 702/27 |
| 2012/0106707 A1* | 5/2012 | Billinge | ............ | G01N 23/207 |
| | | | | 378/88 |
| 2012/0313198 A1* | 12/2012 | Ittel | ............ | C03C 8/02 |
| | | | | 257/772 |
| 2013/0197817 A1* | 8/2013 | Billinge | ............ | G16C 99/00 |
| | | | | 702/28 |
| 2014/0114602 A1* | 4/2014 | Billinge | ............ | G01N 23/207 |
| | | | | 702/104 |
| 2018/0228735 A1* | 8/2018 | Bein | ............ | A61K 47/12 |
| 2018/0338927 A1* | 11/2018 | Otsubo | ............ | C08B 11/04 |
| 2018/0364183 A1 | 12/2018 | Toraya et al. | | |
| 2019/0064083 A1* | 2/2019 | Sasaki | ............ | G01N 23/207 |
| 2019/0256747 A1* | 8/2019 | Marchini | ............ | C08L 23/20 |
| 2020/0173938 A1* | 6/2020 | Toraya | ............ | G01N 23/207 |
| 2020/0182809 A1* | 6/2020 | Storer | ............ | G01N 23/207 |

OTHER PUBLICATIONS

Riello et al., "Determining the Degree of Crystallinity in Semicrystalline Materials by Means of the Rietveld Analysis", Journal of Applied Crystallography, vol. 28, 1995, pp. 121-126.

Hideo Toraya, "A new method for quantitative phase analysis using X-ray powder diffraction: direct derivation of weight fractions from observed integrated intensities and chemical compositions of individual phases", Journal of Applied Crystallography, vol. 49, Available Online at: http://dx.doi.org/10.1107/S1600576716010451, 2016, pp. 1508-1516.

\* cited by examiner

DEGREE-OF-CRYSTALLINITY MEASUREMENT APPARATUS, DEGREE-OF-CRYSTALLINITY MEASUREMENT METHOD, AND INFORMATION STORAGE MEDIUM

CROSS-REFERENCE TO RELATED APPLICATION

The present application claims priority from Japanese Application JP 2022-182119 filed on Nov. 14, 2022, the content of which is hereby incorporated by reference into this application.

BACKGROUND OF THE INVENTION

1. Field of the Invention

The present invention relates to a degree-of-crystallinity measurement apparatus, a degree-of-crystallinity measurement method, and an information storage medium, and more particularly, to measurement of a degree of crystallinity using X-ray diffraction.

2. Description of the Related Art

Polymers include crystalline polymers and amorphous polymers. However, even a crystalline polymer does not have an entirely crystalline structure, and includes a crystalline portion and an amorphous portion as a mixture. A proportion of a weight of the crystalline portion with respect to an overall weight of the crystalline polymer is referred to as "degree of crystallinity." The degree of crystallinity is important information in understanding properties of the crystalline polymer, such as a mechanical property and a chemical property.

Of various methods of measuring the degree of crystallinity, a method using X-ray diffraction has great practical advantages in that, in principle, a sample of any size may be used, and in that the method can be executed without destroying the sample, for example.

In the method using the X-ray diffraction, it is known that a degree of crystallinity of a target substance corresponds to a value obtained by dividing an integrated intensity of a scattering pattern (which is, in this case in particular, a diffraction pattern) from the crystalline portion of the target substance by a sum of integrated intensities of scattering patterns from the crystalline portion and the amorphous portion (that is, an integrated intensity of a scattering pattern of the entire target substance).

Accordingly, in order to obtain the degree of crystallinity, it is required to accurately extract at least the diffraction pattern from the crystalline portion from an entire observed pattern. However, it is considered that even the crystalline portion of the target substance has lowered crystallinity in actuality. For that reason, it is considered that an intensity of the diffraction pattern of the crystalline portion of the target substance is observed to be lower than in an actual case and hence the degree of crystallinity of the target substance is calculated to be lower than an actual degree of crystallinity thereof.

SUMMARY OF THE INVENTION (1) According to at least one embodiment of the present invention, there is provided a degree-of-crystallinity measurement apparatus including: an X-ray scattering pattern acquirer configured to acquire an X-ray scattering pattern of a sample including a crystalline portion and an amorphous portion of a target substance; a pattern decomposer configured to acquire a diffraction pattern of the crystalline portion and a continuous pattern from the X-ray scattering pattern; a target substance intensity calculator configured to calculate an integrated intensity of the target substance based on the X-ray scattering pattern and chemical formula information of the target substance; a target substance pattern calculator configured to calculate, from the continuous pattern, a scattering pattern of the target substance including the crystalline portion and the amorphous portion so that an integrated intensity of the target substance matches the integrated intensity calculated by the target substance intensity calculator; a structural disorder parameter determiner configured to determine a structural disorder parameter of the crystalline portion based on the diffraction pattern of the crystalline portion and the scattering pattern of the target substance; and a degree-of-crystallinity output device configured to output a degree of crystallinity of the target substance calculated based on the determined structural disorder parameter.

(2) In the degree-of-crystallinity measurement apparatus according to Item (1), the structural disorder parameter determiner may include: a tentative-degree-of-crystallinity calculator configured to calculate a tentative degree of crystallinity, in which a value obtained by integrating a correction pattern obtained by multiplying the diffraction pattern of the crystalline portion by a structural disorder factor including the structural disorder parameter with a given integration range is a numerator, and a value obtained by integrating the scattering pattern of the target substance with the given integration range is a denominator, for each of a plurality of the structural disorder factors while changing the given integration range; and a parameter selector configured to calculate, for each of a plurality of the structural disorder parameters, an evaluation value by substituting a plurality of the tentative degrees of crystallinity, which have been calculated while changing the given integration range, into a predetermined evaluation equation, and select one of the plurality of the structural disorder parameters based on the evaluation value.

(3) In the degree-of-crystallinity measurement apparatus according to Item (2), the structural disorder factor may be given by the following equation:

$$\exp\left[-k\left(\frac{2\sin\theta}{\lambda}\right)^2\right]$$

where $\lambda$ represents a wavelength of an incident X-ray, and "k" represents the structural disorder parameter.

(4) In the degree-of-crystallinity measurement apparatus according to Item (3), the evaluation value may be expressed as S by the following equation:

$$S = \frac{1}{n}\sum_{n=1}^{N}(f_n - D_0)^2$$

where $f_n$ represents the tentative degree of crystallinity for an n-th integration range, and Do represents a fitting parameter.

(5) In the degree-of-crystallinity measurement apparatus according to any one of Items (1) to (4), the sample may contain one or more crystalline fillers. The pattern decomposer may be configured to acquire, from the X-ray scattering pattern, a diffraction pattern of the one or more crystalline fillers. The target substance intensity calculator may include a crystalline filler intensity calculator configured to calculate an integrated intensity of the diffraction pattern of one of the one or more crystalline fillers. Further, the target substance intensity calculator may be configured to calculate the integrated intensity of the target substance by multiplying the integrated intensity of the one of the one or more crystalline fillers by a ratio corresponding to chemical formula information of the one or more crystalline fillers and the target substance that are contained in the sample.

(6) In the degree-of-crystallinity measurement apparatus according to Item (5), the sample may contain one or more amorphous fillers.

(7) In the degree-of-crystallinity measurement apparatus according to any one of Items (1) to (6), the continuous pattern may include a background. The target substance pattern calculator may include a background subtractor configured to subtract the background from the continuous pattern.

(8) In the degree-of-crystallinity measurement apparatus according to Item (7), the background subtractor may include: a background intensity calculator configured to calculate an integrated intensity of the background based on the integrated intensity of the X-ray scattering pattern of the sample and chemical formula information of a substance contained in the sample; and a background calculator configured to calculate the background so that an integrated intensity of the background matches the integrated intensity calculated by the background intensity calculator.

(9) In the degree-of-crystallinity measurement apparatus according to Item (7) or (8), the target substance pattern calculator may be configured to calculate the scattering pattern of the target substance by multiplying the continuous pattern from which the background has been subtracted by a ratio corresponding to the integrated intensity calculated by the target substance intensity calculator.

(10) According to at least one embodiment of the present invention, there is provided a degree-of-crystallinity measurement method including: an X-ray scattering pattern acquiring step of acquiring an X-ray scattering pattern of a sample including a crystalline portion and an amorphous portion of a target substance; a pattern decomposing step of acquiring a diffraction pattern of the crystalline portion and a continuous pattern from the X-ray scattering pattern; a target substance intensity calculating step of calculating an integrated intensity of the target substance based on the X-ray scattering pattern and chemical formula information of the target substance; a target substance pattern calculating step of calculating, from the continuous pattern, a scattering pattern of the target substance including the crystalline portion and the amorphous portion so that an integrated intensity of the target substance matches the integrated intensity calculated in the target substance intensity calculating step; a structural disorder parameter determining step of determining a structural disorder parameter of the crystalline portion based on the diffraction pattern of the crystalline portion and the scattering pattern of the target substance; and a degree-of-crystallinity outputting step of outputting a degree of crystallinity of the target substance calculated based on the determined structural disorder parameter.

(11) According to at least one embodiment of the present invention, there is provided a non-transitory computer-readable information storage medium having stored thereon a program for causing a computer to operate as: an X-ray scattering pattern acquirer configured to acquire an X-ray scattering pattern of a sample including a crystalline portion and an amorphous portion of a target substance; a pattern decomposer configured to acquire a diffraction pattern of the crystalline portion and a continuous pattern from the X-ray scattering pattern; a target substance intensity calculator configured to calculate an integrated intensity of the target substance based on the X-ray scattering pattern and chemical formula information of the target substance; a target substance pattern calculator configured to calculate, from the continuous pattern, a scattering pattern of the target substance including the crystalline portion and the amorphous portion so that an integrated intensity of the target substance matches the integrated intensity calculated by the target substance intensity calculator; a structural disorder parameter determiner configured to determine a structural disorder parameter of the crystalline portion based on the diffraction pattern of the crystalline portion and the scattering pattern of the target substance; and a degree-of-crystallinity output device configured to output a degree of crystallinity of the target substance calculated based on the determined structural disorder parameter.

DETAILED DESCRIPTION OF THE INVENTION

Description is given below in detail of at least one embodiment of the present invention, with reference to the drawings.

Figure 1:
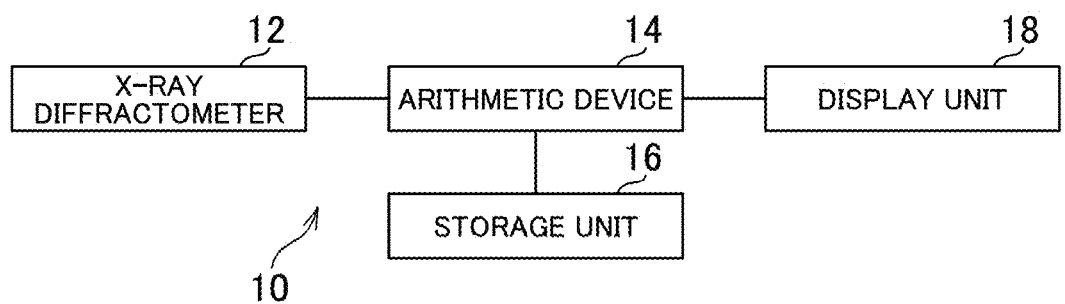
FIG. 1 is a configuration diagram of a degree-of-crystallinity measurement apparatus according to at least one embodiment of the present invention.

FIG. 1 is a diagram illustrating a configuration of a degree-of-crystallinity measurement apparatus according to the at least one embodiment of the present invention. As illustrated in FIG. 1, a degree-of-crystallinity measurement apparatus 10 includes an X-ray diffractometer 12, an arithmetic device 14, a storage unit 16, and a display unit 18. When a degree of crystallinity is calculated based on an observed pattern acquired from another X-ray diffractometer, it is not required that the degree-of-crystallinity measurement apparatus 10 include the X-ray diffractometer 12. In this case, the degree-of-crystallinity measurement apparatus 10 may be formed of the arithmetic device 14, the storage unit 16, and the display unit 18, and in the storage unit 16, the observed pattern acquired from the another X-ray diffractometer is stored in advance.

The X-ray diffractometer 12 performs X-ray diffractometry. Specifically, the X-ray diffractometer 12 allows an X-ray of a known wavelength to enter a sample, and measures an intensity of a scattered X-ray. Data of the X-ray intensity for each value of a diffraction angle 2θ is output as an observed pattern from the X-ray diffractometer 12 to the arithmetic device 14. The observed pattern output to the arithmetic device 14 may be an observed pattern subjected to correction with a Lorentz-polarization factor (Lp correction). The X-ray diffractometer 12 can measure the intensity of the scattered X-ray at each diffraction angle from a minimum angle $2\theta_L$ that is as small as about 10° to a maximum angle $2\theta_H$ that is as large as about 120°. In the present application, a profile of the X-ray intensity measured by the X-ray diffractometer 12 (data indicating a change in X-ray intensity with respect to a change in diffraction angle) is referred to as "X-ray scattering pattern" or "observed pattern." The X-ray scattering pattern is in particular an "X-ray diffraction pattern" when the sample is crystalline.

In the at least one embodiment, the sample serving as a measurement target of the X-ray scattering pattern includes a target substance such as a polymer in a powdery form or having fluidity, which may be in a crystalline state in part and in an amorphous state in the remainder. The sample is mixed with one or more fillers. When the sample is produced, types and a weight fraction of substances forming the sample are known. A chemical formula and a chemical formula weight of each substance are also known.

In the following description, a sample is in a bulk solid form as an example. When such a sample is synthesized, the polymer in powdery form or having fluidity and a plurality of fillers or the like are mixed. Such a mixture is subjected to forming and heating processing to produce a resin material of a product, which is the sample. As a matter of course, the present invention is applicable not only to a sample in a bulk solid form, but also to a sample in a powdery form.

A case in which, as such a sample, a sample containing a polyphenylene sulfide (PPS) resin, which is known as a high-performance engineering plastic, as the target substance is subjected to degree-of-crystallinity measurement is taken as an example below. It is assumed that this sample is mixed with a calcium carbonate ($CaCO_3$) as a crystalline filler and E-glass fiber as an amorphous filler. However, the present invention may be applied to the degree-of-crystallinity measurement of various target substances in various samples other than the above-mentioned sample. For example, the crystalline filler and the amorphous filler may not be mixed with the sample. In another case, a plurality of types of crystalline fillers may be mixed in the sample. Similarly, a plurality of types of amorphous fillers may be mixed in the sample.

The arithmetic device 14 is formed of, for example, a publicly known computer system, and includes a CPU and a memory. The storage unit 16 formed of a computer-readable information storage medium such as a solid state disk (SSD) or a hard drive disk (HDD) is connected to the arithmetic device 14. The storage unit 16 stores a degree-of-crystallinity measurement program in at least one embodiment of the present invention, and the apparatus and the method according to at least one embodiment of the present invention are implemented by the arithmetic device 14 executing the program. The storage unit 16 further stores chemical formula information of each substance contained in the sample (a chemical formula, a chemical formula weight, and the number of electrons for each atom contained in the substance), and the weight fraction of the substances.

The display unit 18 is a display device which displays a result of calculation by the arithmetic device 14. For example, the display unit 18 displays a degree of crystallinity of the target substance as a numerical value or a graph.

Now, a procedure for calculating the degree of crystallinity using the degree-of-crystallinity measurement apparatus 10 is described. The calculation of the degree of crystallinity is roughly classified into (1) pattern decomposition, (2) calculation of a structural disorder parameter, (3) calculation of an integrated intensity of a pattern derived from each component, and (4) calculation of a pattern of the entire target substance (PPS).

Figure 2A:
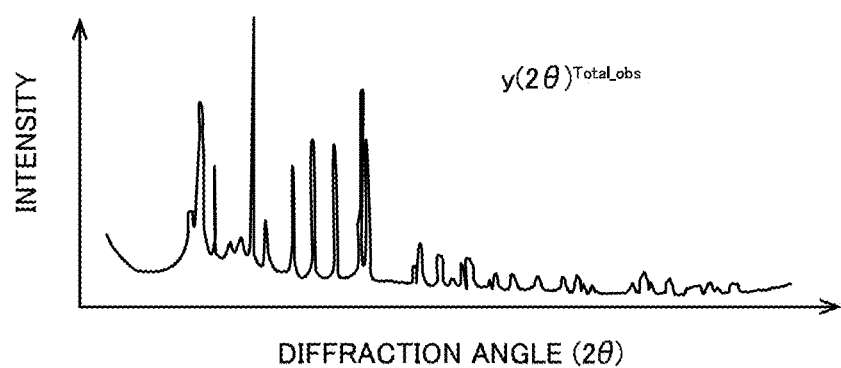
FIG. 2A is a graph schematically showing an example of an observed pattern of a sample.

(1) Pattern decomposition: When an observed pattern $y(2\theta)^{Total\_obs}$, which is the X-ray scattering pattern of the sample, is acquired from the X-ray diffractometer 12, the observed pattern $y(2\theta)^{Total\_obs}$ is decomposed into a plurality of patterns. FIG. 2A schematically shows the observed pattern $y(2\theta)^{Total\_obs}$. As shown in FIG. 2A, the observed pattern $y(2\theta)^{Total\_obs}$ includes a large number of peaks derived from one or more crystal components and a gentle continuous pattern. As described above, the sample includes a crystalline portion and an amorphous portion of the PPS, a calcium carbonate being a crystalline filler, and an E-glass fiber being an amorphous filler. In view of this, as expressed by Equation (1), the observed pattern $y(2\theta)^{Total\_obs}$ is decomposed into a diffraction pattern $y(2\theta)_{P\_C}$ of the crystalline portion of the PPS, a diffraction pattern $y(2\theta)_{CF}$ of the crystalline filler, and a continuous pattern $y(2\theta)_H$.

$$y(2\theta)^{Total\_obs} = y(2\theta)_{P\_C} + y(2\theta)_{CF} + y(2\theta)_H \qquad (1)$$

Figure 2B:
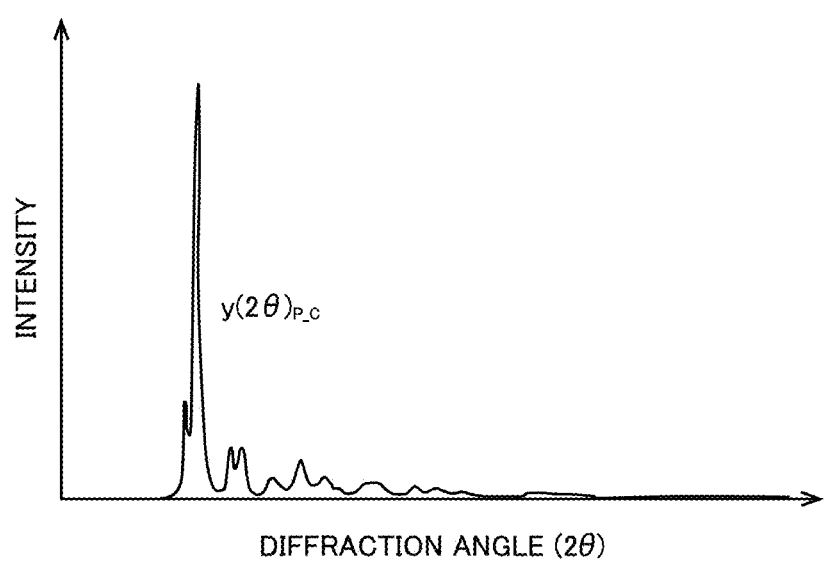
FIG. 2B is a graph schematically showing a diffraction pattern of a crystalline portion of a target substance.
Figure 2C:
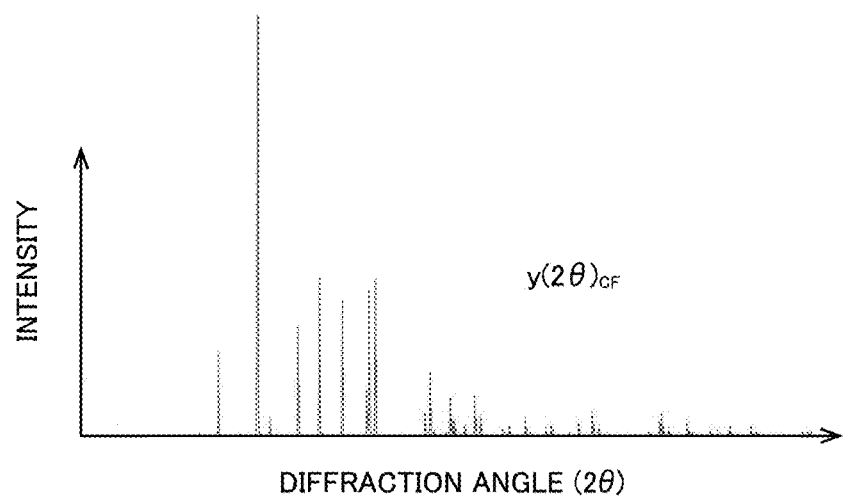
FIG. 2C is a graph schematically showing an example of a diffraction pattern of a crystalline filler.
Figure 2D:
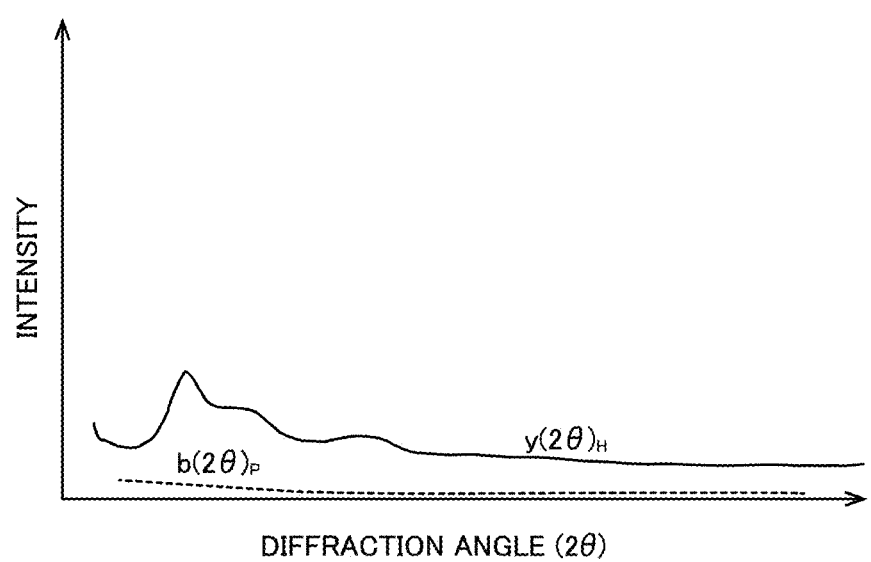
FIG. 2D is a graph schematically showing an example of a continuous pattern.

FIG. 2B schematically shows the diffraction pattern $y(2\theta)_{P\_C}$ of the crystalline portion of the PPS. FIG. 2C schematically shows the diffraction pattern $y(2\theta)_{CF}$ of the crystalline filler. Further, FIG. 2D schematically shows the continuous pattern $y(2\theta)_H$.

For the pattern decomposition, for example, a whole-powder-pattern fitting (WPPF) method such as a Rietveld method or whole-powder-pattern decomposition (WPPD) is used. At this time, the pattern $y(2\theta)_{P\_C}$ and the pattern $y(2\theta)_{CF}$ are identified based on the lattice constants and other crystal structure information (structural parameters) of the PPS and the calcium carbonate.

The continuous pattern $y(2\theta)_H$ is identified based on a known reference continuous pattern $y(2\theta)_H^{100}$. That is, the continuous pattern $y(2\theta)_H$ is assumed as in Equation (2), where Sc represents a scale factor that is a variable parameter and $a(2\theta)$ represents an auxiliary function including a variable parameter. The auxiliary function is a polynomial or other function that can be reshaped through the variable parameter.

$$y(2\theta)_H = Sc \times y(2\theta)_H^{100} + a(2\theta) \qquad (2)$$

Through substitution of Equation (2) into Equation (1), the observed pattern $y(2\theta)^{Total\_obs}$ can be expressed as Equation (3).

$$y(2\theta)^{Total\_obs} = y(2\theta)_{P\_C} + y(2\theta)_{CF} + Sc_H y(2\theta)_H^{100} + a(2\theta) \quad (3)$$

Figure 3A:
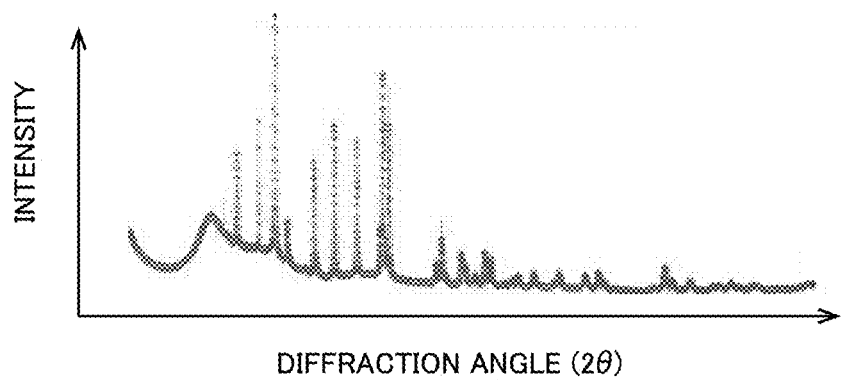
FIG. 3A is a graph schematically showing an example of an X-ray scattering pattern of the sample obtained when the entire target substance is amorphized.
Figure 3B:
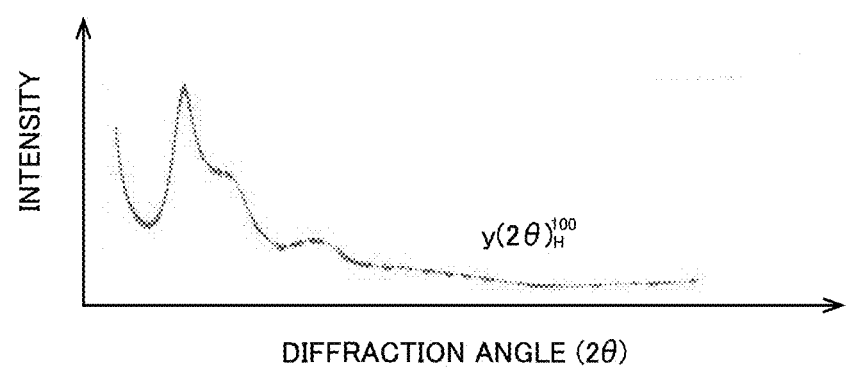
FIG. 3B is a graph schematically showing a reference continuous pattern created based on the X-ray scattering pattern shown in FIG. 3A.

The reference continuous pattern $y(2\theta)_H^{100}$ has been created based on the X-ray scattering pattern measured after sufficiently melting the sample at a high temperature in advance to completely amorphize the PPS. FIG. 3A shows the X-ray scattering pattern of the sample in which the PPS has been thus completely amorphized. The X-ray scattering pattern includes peaks ascribable to the crystalline filler, and hence it is possible to obtain the reference continuous pattern $y(2\theta)_H^{100}$ shown in FIG. 3B by removing those peaks. The reference continuous pattern $y(2\theta)_H^{100}$ includes a continuous pattern ascribable to the amorphous portion of the PPS, a continuous pattern ascribable to the amorphous filler, and a background, and is considered to be similar to the continuous pattern $y(2\theta)_H$. In views of this, in the at least one embodiment, the continuous pattern $y(2\theta)_H$ is obtained by fitting the scale factor Sc, by which the reference continuous pattern is multiplied, and the auxiliary function $a(2\theta)$.

The pattern $y(2\theta)_{P\_C}$ and the pattern $y(2\theta)_{CF}$ obtained as described above may be corrected by Equations (4) and (5). Equations (4) and (5) are used to obtain $y(2\theta)_{CF}^{obs}$ and $y(2\theta)_{P\_C}^{obs}$ by proportionally distributing a value obtained by subtracting the continuous pattern $y(2\theta)_H$ from the observed pattern $y(2\theta)^{Total\_obs}$ by values of $y(2\theta)_{P\_C}$ and $y(2\theta)_{CF}$, respectively. Through use of those obtained values in place of $y(2\theta)_{P\_C}$ and $y(2\theta)_{CF}$, a degree of crystallinity DOC can be obtained more accurately.

$$y(2\theta)_{CF}^{obs} = \frac{y(2\theta)_{CF}}{y(2\theta)_{CF} + y(2\theta)_{P\_C}} \left[ y(2\theta)^{Total\_obs} - Sc_H y(2\theta)_H^{100} - a(2\theta) \right] \quad (4)$$

$$y(2\theta)_{P\_C}^{obs} = \frac{y(2\theta)_{P\_C}}{y(2\theta)_{CF} + y(2\theta)_{P\_C}} \left[ y(2\theta)^{Total\_obs} - Sc_H y(2\theta)_H^{100} - a(2\theta) \right] \quad (5)$$

(2) Calculation of the structural disorder parameter: The degree of crystallinity DOC is expressed by Equation (6), where $w_{P\_C}$ represents a weight fraction of the crystalline portion of the PPS and $W_{P\_NC}$ represents a weight fraction of the amorphous portion of the PPS.

$$DOC = \frac{w_{P\_C}}{w_{P\_C} + w_{P\_NC}} \quad (6)$$

Incidentally, when K substances are contained in a sample, there is a relationship expressed by Equation (7) between an integrated intensity $Y_k$ derived from the k-th substance and a weight fraction $w_k$ of the k-th substance. This relationship is also described in, for example, J. Appl. Cryst. (2016). 49, 1508-1516, Japanese Patent No. 6231726, WO 2017/149913 A1, and the like. When the integrated intensity $Y_k$ is calculated, an integrand is obtained by multiplying the scattering pattern of the k-th substance by the Lp correction factor. Further, an integration range thereof is set to the entire range, for example, a range of from $2\theta_L$ of about 10 degrees to $2\theta_H$ of about 120 degrees.

$$w_k = a_k Y_k \left( \sum_{k'=1}^{K} a_{k'} Y_{k'} \right)^{-1} \quad (7)$$

In Equation (7), a reciprocal of $a_k$ is given by Equation (8). In Equation (8), $N_k^A$ is the number of atoms contained in a chemical formula of the k-th substance, $n_{ki}$ is the number of electrons for the i-th atom contained in the chemical formula of the k-th substance, and $M_k$ is a chemical formula weight of the k-th substance contained in the sample. In the present application, the number of atoms $N_k^A$, the number of electrons $n_{ki}$, and the chemical formula weight $M_k$ are referred to as "chemical formula information."

$$a_k^{-1} = M_k^{-1} \Sigma_i^{N_k^A} n_{ki}^2 \quad (8)$$

From Equations (7) and (6), the degree of crystallinity DOC is expressed by Equation (9), where $Y_{P\_C}$ represents an integrated intensity of the crystalline portion of the PPS, $Y_{P\_NC}$ represents an integrated intensity of the amorphous portion of the PPS, and $Y_P$ represents an integrated intensity of the entire PPS.

$$DOC = \frac{Y_{P\_C}}{Y_{P\_C} + Y_{P\_NC}} = \frac{Y_{P\_C}}{Y_P} \quad (9)$$

Incidentally, in such a substance as the PPS in which a crystalline portion and an amorphous portion are mixed with each other, it is considered that even the crystalline portion has lowered crystallinity in actual fact. For that reason, it is considered that $y(2\theta)_{P\_C}$ is observed to be lower than in an actual case. In view of this, as expressed by Equation (10), a correction pattern $y(2\theta)_{P\_C}^D$ is used to calculate the integrated intensity of the crystalline portion of the PPS. Then, the corrected integrated intensity calculated in such a manner is used as a numerator of Equation (9) to obtain a more accurate degree of crystallinity DOC.

$$y(2\theta)_{P\_C}^D = y(2\theta)_{P\_C} \exp\left[-k\left(\frac{2\sin\theta}{\lambda}\right)^2\right] \quad (10)$$

In Equation (10), the correction pattern $y(2\theta)_{P\_C}^D$ is obtained by multiplying the original pattern $y(2\theta)_{P\_C}$ by a structural disorder factor expressed by Equation (11).

$$\exp\left[-k\left(\frac{2\sin\theta}{\lambda}\right)^2\right] \quad (11)$$

In Equation (11), $\lambda$ is a wavelength of an incident X-ray, and "k" is a structural disorder parameter. The structural disorder parameter "k" indicates a degree of a decrease in degree of crystallinity, and is determined as follows.

That is, a partial integrated intensity of the crystal portion of the PPS is calculated by Equation (12) with the integration range of from $2\theta_L$ to $2\theta_n$. In addition, a partial integrated intensity of the entire PPS is calculated by Equation (13). In Equations (12) and (13), $2\theta_n$ represents a diffraction angle that is an upper limit of the integration range, and indicates an n-th angle exhibited when, for example, a range of from about 60 degrees to about 120 degrees is divided into N. In addition, $G(2\theta)$ represents an Lp correction factor. The "partial integrated intensity" means an intensity obtained through integration over a part of the integration range. Of the integrands of Equation (13), how to obtain $y(2\theta)_P$, which indicates the scattering pattern of the entire PPS, will be described later.

$$Y(2\theta_n)_{P\_C} = \int_{2\theta_L}^{2\theta_n} y(2\theta)_{P\_C}^D G(2\theta) d(2\theta) \quad (12)$$

$$Y(2\theta_n)_P = \int_{2\theta_L}^{2\theta_n} y(2\theta)_P (2\theta) d(2\theta) \quad (13)$$

Then, Equations (12) and (13) are used to define a tentative degree $f_n$ of crystallinity as expressed by Equations (14) and (15).

$$DOC(2\theta_n, k) = \frac{Y_{P_C}(2\theta_n, k)}{Y_P(2\theta_n)} \quad (14)$$

$$f_n = DOC(2\theta_n, k) \quad (15)$$

It is considered that the tentative degree $f_n$ of crystallinity eventually converges to a value of a true degree of crystallinity while fluctuating about the value of the true degree of crystallinity as a value of "n" increases. This is because large peaks, which greatly affect the value of the integrated intensity, are scattered in a low-angle region. Thus, when an evaluation value S expressed by Equation (16) is minimized, a value of the structural disorder parameter "k" is considered probable. In Equation (16), $D_0$ represents a fitting (variable) parameter, and assumes a value approximating the true degree of crystallinity when fitting is completed.

$$S = \frac{1}{n}\sum_{n=1}^{N}(f_n - D_0)^2 \quad (16)$$

In the at least one embodiment, the structural disorder parameter "k" that gives the smallest evaluation value S is identified by performing an arithmetic operation to obtain the evaluation value S a plurality of times while changing a pair of the structural disorder parameter "k" and the parameter $D_0$. In this processing, for example, a Nelder-Mead method (also referred to as "simplex method" or "amoeba method"), which is a kind of optimization algorithm, may be used. Once the value of the structural disorder parameter "k" is identified, the value of "k" is used to obtain the true degree of crystallinity DOC by Equation (14) with the integration range of from $2\theta_L$ to $2\theta_H$. In another case, the above-mentioned value of $D_0$ may be used as the true degree of crystallinity DOC.

(3) Calculation of the integrated intensity of each component in the sample: Of the integrands of Equation (13), in order to obtain $y(2\theta)_P$, which indicates the scattering pattern of the entire PPS, the integrated intensity of each component in the sample is calculated.

First, an integrated intensity $Y^{Total\_obs}$ of the observed pattern $y(2\theta)^{Total\_obs}$ is calculated using Equation (17).

$$Y^{Total\_obs} = \int_{2\theta_L}^{2\theta_H} y(2\theta)^{Total\_obs} G(2\theta) d(2\theta) \quad (17)$$

Further, an integrated intensity $Y_{CF}$ of the diffraction pattern $y(2\theta)_{CF}$ of a crystalline filler is calculated using Equation (18).

$$Y_{CF} = \int_{2\theta_L}^{2\theta_H} y(2\theta)_{CF} G(2\theta) d(2\theta) \quad (18)$$

Subsequently, Equation (19) can be obtained by modifying Equation (7). Thus, a total sum $Y_{Total}$ of integrated intensities of all substances contained in the sample can be derived from $Y_{CF}$ (Equation (18)), which is an integrated intensity of a single substance.

$$Y_{Total} = \frac{a_{CF}}{w_{CF}}\left(\sum_{k'=1}^{K}\frac{w_{k'}}{a_{k'}}\right)Y_{CF} \quad (19)$$

Accordingly, through substitution of Equations (17) and (19) into Equation (20), an integrated intensity $B_P$ of a background can be obtained.

$$B_P = Y^{Total\_obs} - Y_{Total} \quad (20)$$

Further, Equation (21) can be obtained by modifying Equation (7). Thus, the integrated intensity $Y_P$ of the entire PPS can also be derived from $Y_{CF}$, which is an integrated intensity of a single substance.

$$Y_P = \frac{w_P}{a_P} \cdot \frac{a_{CF}}{w_{CF}} Y_{CF} \quad (21)$$

(4) Calculation of the scattering pattern $y(2\theta)_P$ of the entire PPS: Here, the scattering pattern $y(2\theta)_P$ of the entire PPS is derived from the continuous pattern $y(2\theta)_H$. As a premise thereof, a background pattern $b(2\theta)_P$ is obtained. In this case, a background pattern $b(2\theta)_{Si}$ of alpha-SiO$_2$, which is known, is scaled by Equation (22), to thereby obtain the background pattern $b(2\theta)_P$.

$$b(2\theta)_P = \frac{B_P}{B_{Si}} b(2\theta)_{Si} \quad (22)$$

In Equation (22), $B_{Si}$ can be obtained using Equation (23).

$$B_{Si} = \int_{2\theta_L}^{2\theta_H} b(2\theta)_{Si} G(2\theta) d(2\theta) \quad (23)$$

The background pattern $b(2\theta)_{Si}$ of alpha-SiO$_2$ has been selected because a value of $a_k$ calculated for an average chemical composition of the entire sample in the at least one embodiment and a value of $a_k$ calculated for alpha-SiO$_2$ are close to each other.

Subsequently, Equation (24) is used to subtract the background pattern $b(2\theta)_P$ from the continuous pattern $y(2\theta)_H$, to thereby obtain a corrected continuous pattern $y(2\theta)_{H\_NC}$.

$$y(2\theta)_{H\_NC} = y(2\theta)_H - b(2\theta)_P \quad (24)$$

The pattern $y(2\theta)_{H\_NC}$ includes a pattern derived from the amorphous portion of the PPS and a pattern derived from the amorphous filler. There is no big difference in shape between the pattern derived from the amorphous portion of the PPS and the pattern derived from the amorphous filler. Further, the scattering pattern $y(2\theta)_P$ of the entire PPS is simply integrated by Equation (13) to be used for calculation. Thus, the corrected continuous pattern $y(2\theta)_{H\_NC}$ is scaled by Equation (24), to thereby obtain the pattern $y(2\theta)_P$ of the entire PPS.

$$y(2\theta)_P = \frac{Y_P}{Y_{H\_NC}} y(2\theta)_{H\_NC} \quad (25)$$

In Equation (25), an integrated intensity $Y_{H\_NC}$ can be calculated by Equation (26).

$$Y_{H\_NC} = \int_{2\theta_L}^{2\theta_H} y(2\theta)_{H\_NC} G(2\theta) d(2\theta) \quad (26)$$

As described above, it is possible to obtain the scattering pattern $y(2\theta)_P$ of the entire PPS and to thereby calculate the structural disorder parameter "k". Then, through use of the calculated "k", a more accurate degree of crystallinity DOC can be obtained.

Figure 4:
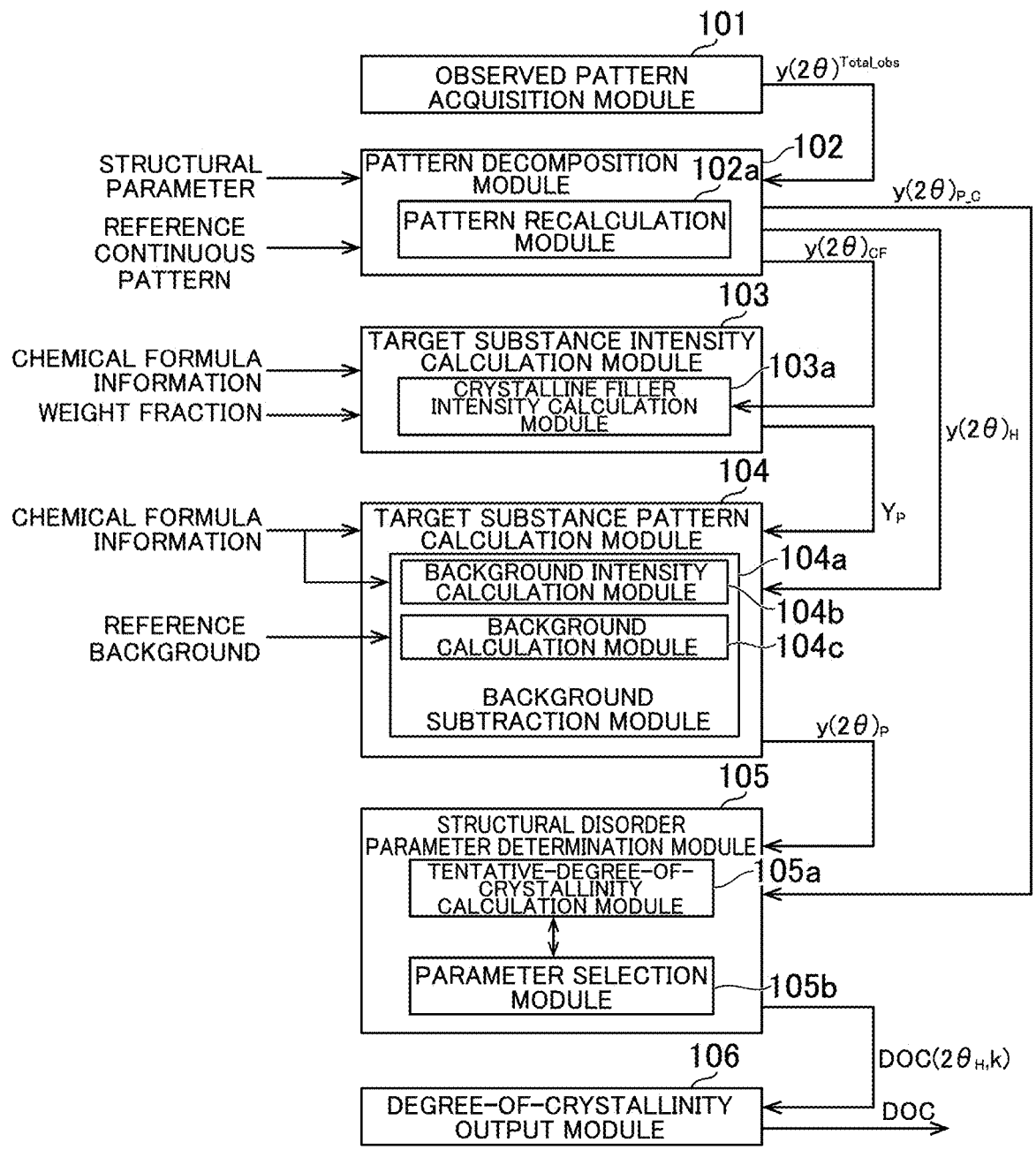
FIG. 4 is a functional block diagram of the degree-of-crystallinity measurement apparatus according to the at least one embodiment of the present invention.

Now, details of the degree-of-crystallinity measurement apparatus 10 will be described. FIG. 4 is a functional block diagram of the degree-of-crystallinity measurement apparatus 10. As illustrated in FIG. 4, the degree-of-crystallinity measurement apparatus 10 functionally includes an observed pattern acquisition module 101, a pattern decomposition module 102, a target substance intensity calculation module 103, a target substance pattern calculation module 104, a structural disorder parameter determination module 105, and a degree-of-crystallinity output module 106. The pattern decomposition module 102 includes a pattern recalculation module 102a. The target substance intensity calculation module 103 includes a crystalline filler intensity calculation module 103a. The target substance pattern calculation module 104 includes a background subtraction module 104a, and the background subtraction module 104a includes a background intensity calculation module 104b and a background calculation module 104c. In addition, the structural disorder parameter determination module 105 includes a tentative-degree-of-crystallinity calculation module 105a and a parameter selection module 105b. Those functions are implemented through execution of the above-mentioned degree-of-crystallinity measurement program by the arithmetic device 14, which is a computer system.

The observed pattern acquisition module 101 acquires the observed pattern $y(2\theta)^{Total\_obs}$, which is the X-ray scattering pattern of the sample, from the X-ray diffractometer 12.

The pattern decomposition module 102 uses the whole-powder-pattern fitting method to decompose the observed pattern $y(2\theta)^{Total\_obs}$ into the diffraction pattern $y(2\theta)_{P\_C}$ of the crystalline portion of the PPS, the pattern $y(2\theta)_{CF}$ ascribable to the crystalline filler, and the continuous pattern $y(2\theta)_H$. The pattern decomposition module 102 identifies the pattern $Y(2\theta)_{P\_C}$ and the pattern $y(2\theta)_{CF}$ based on the structural parameters of the PPS and the calcium carbonate. Further, the continuous pattern $y(2\theta)_H$ is identified based on the reference continuous pattern $y(2\theta)_H^{100}$.

The pattern decomposition module 102 includes the pattern recalculation module 102a. The pattern recalculation module 102a uses Equations (4) and (5) to calculate $y(2\theta)_{CF}^{obs}$ and $y(2\theta)_{P\_C}^{obs}$ from the observed pattern $y(2\theta)^{Total\_obs}$. In the subsequent processing, $y(2\theta)_{CF}^{obs}$ and $y(2\theta)_{P\_C}^{obs}$ are used in place of $y(2\theta)_{CF}$ and $y(2\theta)_{P\_C}$ obtained through the pattern decomposition.

The target substance intensity calculation module 103 calculates the integrated intensity $Y_P$ for the entire PPS (including the crystalline portion and the amorphous portion). The crystalline filler intensity calculation module 103a of the target substance intensity calculation module 103 is supplied, from the pattern decomposition module 102, with the diffraction pattern $y(2\theta)_{CF}$ of the crystalline filler obtained from the observed pattern $y(2\theta)^{Total\_obs}$. Thus, the crystalline filler intensity calculation module 103a calculates the integrated intensity $Y_{CF}$ of the diffraction pattern of the crystalline filler using Equation (18). The target substance intensity calculation module 103 calculates the integrated intensity $Y_P$ of the target substance by multiplying the integrated intensity $Y_{CF}$ of the diffraction pattern of the crystalline filler calculated in such a manner by a ratio corresponding to the chemical formula information of the crystalline filler and the target substance contained in the sample. Specifically, the integrated intensity $Y_P$ is calculated using Equation (21).

The target substance pattern calculation module 104 calculates, from the continuous pattern $y(2\theta)_H$, the scattering pattern $y(2\theta)_P$ of the entire PPS (including the crystalline portion and the amorphous portion) so that an integrated intensity thereof matches $Y_P$.

The background subtraction module 104a of the target substance pattern calculation module 104 obtains the continuous pattern $y(2\theta)_{H\_NC}$ corrected by Equation (24). At this time, the background intensity calculation module 104b calculates the integrated intensity $B_P$ of the background pattern $b(2\theta)_P$ based on the integrated intensity $y^{Total\_obs}$ of the X-ray scattering pattern of the sample and the chemical formula information of the substances (PPS, calcium carbonate, and E-glass fiber) contained in the sample. Specifically, $B_P$ is calculated based on Equations (17) to (20). Then, the background calculation module 104c calculates the background pattern $b(2\theta)_P$ so that an integrated intensity thereof matches the integrated intensity $B_P$ calculated by the background intensity calculation module 104b. Specifically, $b(2\theta)_{Si}$ that is a reference background is used to calculate the background pattern $b(2\theta)_P$ with Equation (22).

The target substance pattern calculation module 104 calculates the scattering pattern $y(2\theta)_P$ of the target substance by multiplying the corrected continuous pattern $y(2\theta)_{H\_NC}$ by a ratio corresponding to the integrated intensity $Y_P$ calculated by the target substance intensity calculation module 103. Specifically, $y(2\theta)_P$ is calculated using Equation (25).

The structural disorder parameter determination module 105 determines the structural disorder parameter "k" of the crystalline portion of the PPS based on the diffraction pattern $y(2\theta)_{P\_C}$ of the crystalline portion of the PPS and the scattering pattern $y(2\theta)_P$ of the entire PPS. The tentative-degree-of-crystallinity calculation module 105a calculates the tentative degree $f_n$ of crystallinity in accordance with Equations (14) and (15).

The tentative-degree-of-crystallinity calculation module 105a calculates the tentative degree $f_n$ of crystallinity (1 to N) and the evaluation value S expressed by Equation (16) for the pair of the structural disorder parameter "k" and the parameter $D_0$ while changing values thereof. Of those, the parameter selection module 105b selects the pair of the values of the structural disorder parameter "k" and the parameter $D_0$ for which the value of the evaluation value S becomes smaller.

The degree-of-crystallinity output module 106 outputs, as the true degree of crystallinity DOC, the degree of crystallinity corresponding to the structural disorder parameter "k" selected by the parameter selection module 105b. The degree-of-crystallinity output module 106 outputs the degree of crystallinity DOC by, for example, displaying the degree of crystallinity DOC on the display unit 18.

According to the degree-of-crystallinity measurement apparatus 10 described above, the structural disorder parameter "k" can be appropriately determined, and a more accurate degree of crystallinity DOC can be obtained through use of the determined structural disorder parameter "k".

The present invention is not limited to the at least one embodiment described above. Various modifications can be made thereto, and such modifications are also encompassed in the scope of the present invention.

For example, in the at least one embodiment described above, the integrated intensity $Y_P$ of the PPS that is a target substance is obtained from the integrated intensity $Y_{CF}$ of a crystalline filler (Equation (21)). Alternatively, when the integrated intensity $B_P$ of a background is known, through use of Equation (20), the integrated intensity $Y_{Total}$ can be obtained from the integrated intensity $Y^{Total\_obs}$ of an observed pattern (Equation (20)), and in the same manner as in Equation (19), not only the integrated intensity $Y_P$ of the PPS that is the target substance but also the integrated intensities of all substances can be obtained from the integrated intensity $Y_{Total}$.

Further, in the at least one embodiment described above, $y(2\theta)_P$ is obtained by scaling the corrected continuous pattern $y(2\theta)_{H\_NC}$. Alternatively, a pattern $y(2\theta)_{P\_NC}$ of the amorphous portion of the PPS may be obtained by scaling the continuous pattern $y(2\theta)_{H\_NC}$, and the pattern $y(2\theta)_{P\_NC}$ and $y(2\theta)_{P\_C}$ may be added to obtain $y(2\theta)_P$.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A degree-of-crystallinity measurement apparatus, comprising:
    an X-ray scattering pattern acquirer configured to acquire an X-ray scattering pattern of a sample including a crystalline portion and an amorphous portion of a target substance;
    a pattern decomposer configured to acquire a diffraction pattern of the crystalline portion and a continuous pattern from the X-ray scattering pattern;
    a target substance intensity calculator configured to calculate an integrated intensity of the target substance based on the X-ray scattering pattern and chemical formula information of the target substance;
    a target substance pattern calculator configured to calculate, from the continuous pattern, a scattering pattern of the target substance including the crystalline portion and the amorphous portion so that an integrated intensity of the target substance matches the integrated intensity calculated by the target substance intensity calculator;
    a structural disorder parameter determiner configured to determine a structural disorder parameter of the crystalline portion based on the diffraction pattern of the crystalline portion and the scattering pattern of the target substance; and
    a degree-of-crystallinity output device configured to output a degree of crystallinity of the target substance calculated based on the determined structural disorder parameter.

2. The degree-of-crystallinity measurement apparatus according to claim 1, wherein the structural disorder parameter determiner includes:
    a tentative-degree-of-crystallinity calculator configured to calculate a tentative degree of crystallinity, in which a value obtained by integrating a correction pattern obtained by multiplying the diffraction pattern of the crystalline portion by a structural disorder factor including the structural disorder parameter with a given integration range is a numerator and a value obtained by integrating the scattering pattern of the target substance with the given integration range is a denominator, for each of a plurality of the structural disorder factors, while changing the given integration range; and
    a parameter selector configured to calculate, for each of a plurality of the structural disorder parameters, an evaluation value by substituting a plurality of the tentative degrees of crystallinity, which have been calculated while changing the given integration range, into a predetermined evaluation equation, and select one of the plurality of the structural disorder parameters based on the evaluation value.

3. The degree-of-crystallinity measurement apparatus according to claim 2, wherein the structural disorder factor is given by the following equation:

$$\exp\left[-k\left(\frac{2\sin\theta}{\lambda}\right)^2\right]$$

where $\lambda$ represents a wavelength of an incident X-ray, and "k" represents the structural disorder parameter.

4. The degree-of-crystallinity measurement apparatus according to claim 3, wherein the evaluation value is expressed as S by the following equation:

$$S = \frac{1}{n}\sum_{n=1}^{N}(f_n - D_0)^2$$

where $f_n$ represents the tentative degree of crystallinity for an n-th integration range, and $D_0$ represents a fitting parameter.

5. The degree-of-crystallinity measurement apparatus according to claim 1,
    wherein the sample contains one or more crystalline fillers,
    wherein the pattern decomposer is configured to acquire, from the X-ray scattering pattern, a diffraction pattern of the one or more crystalline fillers,
    wherein the target substance intensity calculator includes a crystalline filler intensity calculator configured to calculate an integrated intensity of the diffraction pattern of one of the one or more crystalline fillers, and
    wherein the target substance intensity calculator is configured to calculate the integrated intensity of the target substance by multiplying the integrated intensity of the one of the one or more crystalline fillers by a ratio corresponding to chemical formula information of the one or more crystalline fillers and the target substance that are contained in the sample.

6. The degree-of-crystallinity measurement apparatus according to claim 5, wherein the sample contains one or more amorphous fillers.

7. The degree-of-crystallinity measurement apparatus according to claim 1,
    wherein the continuous pattern includes a background, and
    wherein the target substance pattern calculator includes a background subtractor configured to subtract the background from the continuous pattern.

8. The degree-of-crystallinity measurement apparatus according to claim 7, wherein the background subtractor includes:
    a background intensity calculator configured to calculate an integrated intensity of the background based on the integrated intensity of the X-ray scattering pattern of the sample and chemical formula information of a substance contained in the sample; and
    a background calculator configured to calculate the background so that an integrated intensity of the background matches the integrated intensity calculated by the background intensity calculator.

9. The degree-of-crystallinity measurement apparatus according to claim 7, wherein the target substance pattern calculator is configured to calculate the scattering pattern of the target substance by multiplying the continuous pattern from which the background has been subtracted by a ratio corresponding to the integrated intensity calculated by the target substance intensity calculator.

10. A degree-of-crystallinity measurement method, comprising:

an X-ray scattering pattern acquiring step of acquiring an X-ray scattering pattern of a sample including a crystalline portion and an amorphous portion of a target substance;

a pattern decomposing step of acquiring a diffraction pattern of the crystalline portion and a continuous pattern from the X-ray scattering pattern;

a target substance intensity calculating step of calculating an integrated intensity of the target substance based on the X-ray scattering pattern and chemical formula information of the target substance;

a target substance pattern calculating step of calculating, from the continuous pattern, a scattering pattern of the target substance including the crystalline portion and the amorphous portion so that an integrated intensity of the target substance matches the integrated intensity calculated in the target substance intensity calculating step;

a structural disorder parameter determining step of determining a structural disorder parameter of the crystalline portion based on the diffraction pattern of the crystalline portion and the scattering pattern of the target substance; and a degree-of-crystallinity outputting step of outputting a degree of crystallinity of the target substance calculated based on the determined structural disorder parameter.

11. A non-transitory computer-readable information storage medium having stored thereon a program for causing a computer to operate as:

an X-ray scattering pattern acquirer configured to acquire an X-ray scattering pattern of a sample including a crystalline portion and an amorphous portion of a target substance;

a pattern decomposer configured to acquire a diffraction pattern of the crystalline portion and a continuous pattern from the X-ray scattering pattern;

a target substance intensity calculator configured to calculate an integrated intensity of the target substance based on the X-ray scattering pattern and chemical formula information of the target substance;

a target substance pattern calculator configured to calculate, from the continuous pattern, a scattering pattern of the target substance including the crystalline portion and the amorphous portion so that an integrated intensity of the target substance matches the integrated intensity calculated by the target substance intensity calculator;

a structural disorder parameter determiner configured to determine a structural disorder parameter of the crystalline portion based on the diffraction pattern of the crystalline portion and the scattering pattern of the target substance; and a degree-of-crystallinity output device configured to output a degree of crystallinity of the target substance calculated based on the determined structural disorder parameter.

* * * * *